(12) United States Patent
Middlemiss

(10) Patent No.: US 11,020,925 B2
(45) Date of Patent: Jun. 1, 2021

(54) VARIABLE DENSITY, VARIABLE COMPOSITION OR COMPLEX GEOMETRY COMPONENTS FOR HIGH PRESSURE PRESSES MADE BY ADDITIVE MANUFACTURING METHODS

(71) Applicant: Smith International, Inc., Houston, TX (US)

(72) Inventor: Stewart Middlemiss, Salt Lake City, UT (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 135 days.

(21) Appl. No.: 15/538,215

(22) PCT Filed: Dec. 3, 2015

(86) PCT No.: PCT/US2015/063653
§ 371 (c)(1),
(2) Date: Jun. 21, 2017

(87) PCT Pub. No.: WO2016/109111
PCT Pub. Date: Jul. 7, 2016

(65) Prior Publication Data
US 2017/0368780 A1    Dec. 28, 2017

Related U.S. Application Data

(60) Provisional application No. 62/098,215, filed on Dec. 30, 2014.

(51) Int. Cl.
*B30B 15/02* (2006.01)
*B33Y 10/00* (2015.01)
(Continued)

(52) U.S. Cl.
CPC ............ *B30B 15/022* (2013.01); *B22F 5/007* (2013.01); *B22F 10/00* (2021.01); *B28B 1/001* (2013.01);
(Continued)

(58) Field of Classification Search
CPC ........ B22F 3/008; B22F 7/06; B22F 2207/17; B22F 5/007; B22F 2998/10; B30B 15/34; B28B 1/001; B29C 64/165
See application file for complete search history.

(56) References Cited

U.S. PATENT DOCUMENTS 3,914,078 A * 10/1975 Kendall ................ B01J 3/065
                                                                425/77
4,140,448 A *  2/1979 Brinkeborn .......... B01J 3/065
                                                                425/77
(Continued)

FOREIGN PATENT DOCUMENTS

CN        1411942 A      4/2003
CN      101985176 A      3/2011
(Continued)

OTHER PUBLICATIONS

International Search Report and Written Opinion issued in International patent application PCT/US2015/063653 dated Mar. 4, 2016. 13 pages.
(Continued)

*Primary Examiner* — Xiao S Zhao
*Assistant Examiner* — Emmanuel S Luk

(57) ABSTRACT

A method of manufacturing a component for use in a high pressure press includes successively depositing a volume of one or more materials using a deposition device to build a three dimensional body of the component having a selected material property varied along at least one direction of the component for use in the high pressure press.

10 Claims, 10 Drawing Sheets

(51) Int. Cl.
  *B33Y 80/00* (2015.01)
  *B30B 15/34* (2006.01)
  *B28B 1/00* (2006.01)
  *B24D 18/00* (2006.01)
  *B22F 5/00* (2006.01)
  *B22F 10/00* (2021.01)
  *B22F 7/06* (2006.01)
(52) U.S. Cl.
  CPC .............. *B30B 15/02* (2013.01); *B30B 15/34* (2013.01); *B33Y 10/00* (2014.12); *B33Y 80/00* (2014.12); *B22F 7/06* (2013.01); *B22F 2207/17* (2013.01); *B22F 2998/10* (2013.01); *B24D 18/0009* (2013.01)

(56) References Cited

U.S. PATENT DOCUMENTS

| | | | | |
|---|---|---|---|---|
| 4,529,663 A * | 7/1985 | Lancaster | ............ | C09K 3/1028 162/142 |
| 4,751,099 A * | 6/1988 | Niino | .................... | B22F 3/1109 427/249.15 |
| 5,204,055 A * | 4/1993 | Sachs | ........................ | B05C 19/04 419/2 |
| 5,348,693 A * | 9/1994 | Taylor | .................... | B29C 64/153 156/155 |
| 5,514,232 A | 5/1996 | Burns | | |
| 5,593,531 A * | 1/1997 | Penn | .................... | G03G 15/221 156/272.6 |
| 5,858,525 A | 1/1999 | Carter et al. | | |
| 6,001,298 A * | 12/1999 | McAloon | ............ | B29C 33/3842 264/401 |
| 6,007,318 A * | 12/1999 | Russell | .................... | B29C 41/12 425/130 |
| 6,037,066 A * | 3/2000 | Kuwabara | ............... | B22F 7/008 257/675 |
| 6,066,285 A * | 5/2000 | Kumar | ................. | G03G 15/224 264/439 |
| 6,217,816 B1 * | 4/2001 | Tang | ........................ | B28B 1/00 264/497 |
| 6,338,754 B1 * | 1/2002 | Cannon | .................... | C04B 28/26 106/626 |
| 6,861,613 B1 * | 3/2005 | Meiners | ................. | B29C 64/153 219/121.65 |
| 7,357,887 B2 * | 4/2008 | May | ........................ | G06K 19/06 156/62.2 |
| 7,540,996 B2 * | 6/2009 | Bampton | ............... | B22F 1/0003 419/53 |
| 8,074,566 B1 * | 12/2011 | Bach | ........................ | B01J 3/062 100/102 |
| 8,337,949 B2 * | 12/2012 | Choi | .................... | C01B 32/188 427/227 |
| 8,371,212 B1 * | 2/2013 | Bach | ........................ | B01J 3/062 100/102 |
| 8,475,946 B1 * | 7/2013 | Dion | ........................ | B28B 1/001 428/702 |
| 8,631,876 B2 | 1/2014 | Xu et al. | | |
| 9,249,054 B2 * | 2/2016 | Munday | ................. | B01J 3/067 |
| 9,402,322 B1 * | 7/2016 | Findley | ................. | C04B 35/524 |
| 9,457,533 B2 * | 10/2016 | Middlemiss | ............ | B01J 3/067 |
| 9,586,376 B2 * | 3/2017 | Middlemiss | ............ | B30B 15/34 |
| 9,855,113 B2 * | 1/2018 | Vizanski | ................. | A61C 13/08 |
| 10,239,273 B2 * | 3/2019 | Bao | ........................ | B30B 11/004 |
| 10,494,309 B2 * | 12/2019 | Sani | ........................ | C04B 33/04 |
| 2002/0145213 A1 * | 10/2002 | Liu | ........................ | G03G 15/224 264/40.1 |
| 2002/0167101 A1 * | 11/2002 | Tochimoto | ............. | B29C 41/36 264/40.1 |
| 2003/0074096 A1 * | 4/2003 | Das | ........................ | B33Y 30/00 700/119 |
| 2005/0225004 A1 * | 10/2005 | May | ........................ | B29C 64/393 264/113 |
| 2006/0039818 A1 | 2/2006 | Tsai et al. | | |
| 2007/0014965 A1 * | 1/2007 | Chodelka | ............. | F16J 15/0806 428/66.4 |
| 2007/0060463 A1 * | 3/2007 | Gaumann | ................. | B22F 3/22 501/1 |
| 2008/0073126 A1 * | 3/2008 | Shen | ........................ | E21B 10/567 175/434 |
| 2010/0009133 A1 * | 1/2010 | Chait | ................. | B29C 64/112 428/195.1 |
| 2011/0129640 A1 * | 6/2011 | Beall | ........................ | B28B 1/001 428/116 |
| 2012/0225989 A1 * | 9/2012 | Broadley | ................. | B28B 3/20 524/439 |
| 2013/0034633 A1 * | 2/2013 | von Hasseln | ............ | A23P 30/00 426/104 |
| 2013/0104755 A1 * | 5/2013 | Middlemiss | ............ | B01J 3/067 100/214 |
| 2013/0157013 A1 * | 6/2013 | Huson | ........................ | B28B 1/00 428/156 |
| 2013/0263748 A1 * | 10/2013 | Middlemiss | ............ | B01J 3/067 100/305 |
| 2013/0343826 A1 * | 12/2013 | Webb | ........................ | B22F 7/06 407/118 |
| 2015/0301281 A1 * | 10/2015 | Findley | ................. | H05K 1/0274 385/14 |
| 2015/0305158 A1 * | 10/2015 | Findley | ................. | H05K 1/162 174/252 |
| 2015/0314530 A1 * | 11/2015 | Rogren | ................. | B33Y 10/00 264/131 |
| 2017/0174573 A1 * | 6/2017 | Clark | ................. | C04B 28/001 |
| 2017/0203503 A1 * | 7/2017 | Teicher | ................. | B29C 53/8016 |
| 2018/0215671 A1 * | 8/2018 | Sani | ........................ | C04B 35/583 |

FOREIGN PATENT DOCUMENTS

| | | |
|---|---|---|
| CN | 104338931 A | 2/2015 |
| JP | 11-123521 A | 5/1999 |
| JP | 2004211162 A | 7/2004 |
| WO | 2013108011 A1 | 7/2013 |

OTHER PUBLICATIONS

International Preliminary Report on Patentability issued in International Patent application PCT/US2015/063653, dated Jul. 13, 2017, 10 pages.
First Office Action Issued in Chinese Patent Application 201580076263.3 dated Nov. 11, 2018, 14 pages.
Second Office Action and Search Report issued in Chinese patent application 201580076263.3 dated Jul. 2, 2019, 13 pages.
Fourth Office Action and Search Report issued in Chinese patent application 201580076263.3 dated May 21, 2020, 17 pages.

* cited by examiner

VARIABLE DENSITY, VARIABLE COMPOSITION OR COMPLEX GEOMETRY COMPONENTS FOR HIGH PRESSURE PRESSES MADE BY ADDITIVE MANUFACTURING METHODS

CROSS REFERENCE

This application claims the benefit of U.S. Provisional Application No. 62/098,215, entitled "VARIABLE DENSITY, VARIABLE COMPOSITION OR COMPLEX GEOMETRY COMPONENTS FOR HIGH PRESSURE PRESSES MADE BY ADDITIVE MANUFACTURING METHODS," filed Dec. 30, 2014, the disclosure of which is hereby incorporated herein by reference.

BACKGROUND

High pressure, high temperature ("HPHT") sintering processes include using a high-pressure press, such as a cubic press, a belt press, or a toroid press, to subject a material or material mixture to high pressure and high temperature conditions. The material may be held within a container that is placed inside the press, where both the material and the container are subjected to HPHT conditions. The container should be sufficiently deformable to transmit pressure to the material being pressed, but must also be strong enough to seal the central compartment in which the material being sealed is held so that high pressure can be developed within the central compartment. In some processes, an insulating sleeve, made of a low thermal conductivity material, is assembled between the container and the material being pressed to reduce heat dissipation through the container.

When used to sinter ultra-hard materials, such as polycrystalline diamond (PCD) and polycrystalline cubic boron nitride (PCBN), a high-pressure press may apply pressures in the range of 5 to 8 GPa and temperatures in the range of 1300 to 1650° C. However, some materials may be pressed under a pressure of greater than 8 GPa and a temperature greater than 1650° C. For example, a binderless nano-polycrystalline PCD material may be sintered in a high-pressure press at a pressure of about 15 GPa and a temperature of about 2300° C.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of manufacturing a component for use in a high pressure press that includes successively depositing a volume of one or more materials using a deposition device to build a three dimensional body of the component having a selected material property varied along at least one direction of the component for use in the high pressure press.

In another aspect, embodiments disclosed herein relate to a container for use in a high pressure press that includes a body having a height measured along a central axis and a receiving cavity opening to at least one outer surface of the body, where the body has a density that is uniform along the entire height of the body and varies along a direction transverse to central axis.

In yet another aspect, embodiments disclosed herein relate to a component for use in a high pressure press that includes a body having at least two discrete regions, a first region made of a first material and a second region made of a second material, where the first material and the second material have at least one property difference therebetween, and at least one current path extending in multiple directions through the first region and the second region, the at least one current path made of a conductive material.

Other aspects and advantages of the claimed subject matter will be apparent from the following description and the appended claims.

DETAILED DESCRIPTION

Figure 1:
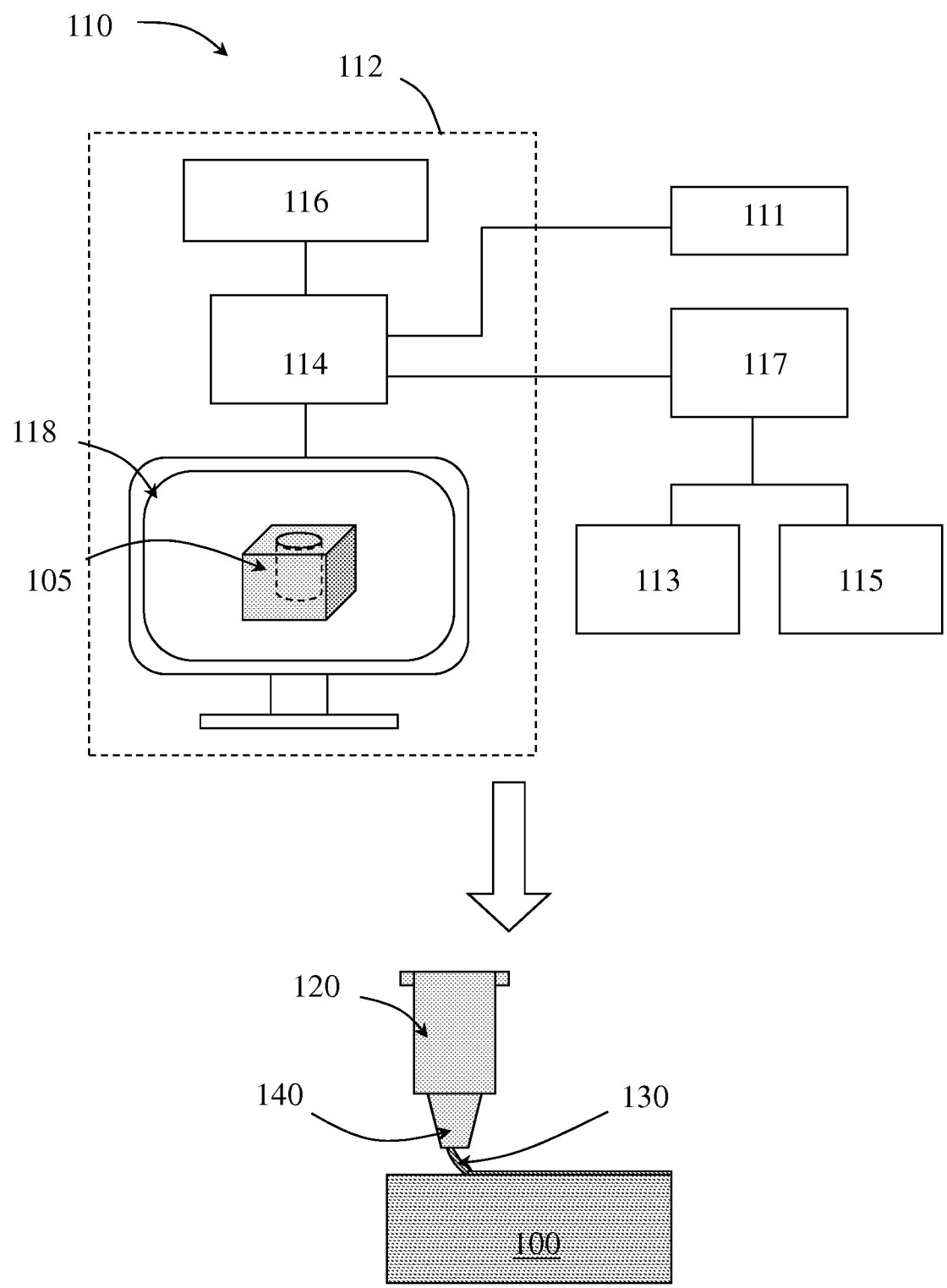
FIG. 1 is a schematic of methods for forming a component of a high pressure press according to embodiments of the present disclosure.

Embodiments disclosed herein relate generally to components used in high-pressure presses that are fabricated using additive manufacturing, such as 3D printing, robot casting, or simultaneous casting. Methods of manufacturing components for use in a high pressure press may include successively depositing a volume of one or more materials to build a three dimensional body of the component, where at least two depositions of adjacent volumes have the same material composition. For example, a component made from additive manufacturing processes according to embodiments of the present disclosure may be made by depositing multiple layers to build the component geometry, each layer made of or including one or more ceramic composite materials, graphite, thermally insulating materials, sealing or gasketing materials, and/or low resistance metals to form one or more different regions of the component. The number of distinct layers may vary, for example, from a lower limit of less than about 100, 200, 500 or 1,000 to an upper limit of 100, 200, 500, greater than 500, greater than 1,000, greater than 2,000, greater than 5,000, greater than 10,000, or greater than 100,000, where any lower limit may be used in combination with any upper layer, depending on the size of particles being deposited and the size of the component being made.

According to embodiments of the present disclosure, additive manufacturing may be used to form a component of a high-pressure press, where the component is formed by depositing sequential volumes or layers of selected material in designated regions. By using additive manufacturing methods, as disclosed herein, to form a component of a high pressure press, the component may be designed to have a selected material property that is varied or uniform along one or more directions of the component, where the selected material property design may be selected to provide certain features that are useful during high pressure pressing. The component may be made by additive manufacturing methods of the present disclosure to have the selected material property design throughout. For example, a method of manufacturing a component may include designing the component to have a selected material property varied along at least one direction of the component for use in a high pressure press, and then successively depositing a volume of one or more materials using a deposition device to build a three dimensional body of the component having the selected material property design. A selected material property that may be controllably varied or uniform along one or more directions of a component may include, for example, density, thermal conductivity and/or electrical conductivity, to name a few.

In some embodiments, a method of manufacturing a component for use in a high pressure press includes depositing a first layer on a substrate and depositing multiple sequential layers at least partially adjacent the first layer, where at least a portion of each of the multiple sequential layers are made of the same material composition as adjacent portions of adjacent layers. A binder may be used to bind the first layer and multiple sequential layers together to form the component. In one embodiment, the binder may be mixed within the material composition prior to being deposited by the deposition device. In another embodiment, the binder may be applied through a separate nozzle of the deposition device and simultaneously applied with the material composition. In another embodiment, a layer of the binder may be deposited between layers of the material composition. In yet another embodiment, a combination of deposition methods may be used.

FIG. 1 shows a schematic view of a method for making a component 100 for a high-pressure press using additive manufacturing, according to one or more embodiments. Additive manufacturing allows the component 100 to be created by serially adding small quantities of material at a time under computer control to an evolving geometry. The method includes designing the component 100 using a computer aided design (CAD) assembly 110. The CAD assembly 110 may be or include any software of a computer aided device capable of providing a geometry or digital design 105 for the component 100 in three dimensions. The digital design 105 may be used as a template or guide by a deposition device 120 to fabricate the component 100, as further described herein. In one embodiment, a flowable form of the material 130 used to form the component 100 is extruded through at least one nozzle 140 of the deposition device 120 and deposited layer by layer to create the component 100, as designed by the CAD assembly 110.

The CAD assembly 110 may include one or more computers 112 that may include one or more central processing units 114, one or more input devices or keyboards 116, and one or more monitors 118 on which a software application may be executed. The computer 112 may also include a memory 111 as well as one or more input and output devices, for example, a mouse, a microphone, and a speaker. The mouse, the microphone, and the speaker may be used for, among other purposes, universal access and voice recognition or commanding. The monitor 118 may be touch-sensitive to operate as an input device as well as a display device.

The computer 112 may interface with one or more databases 113, support computers or processors 115, other databases and/or other processors, or the Internet via the network interface 117. It should be understood that the term "interface" refers to any possible external interfaces, wired or wireless. It should also be understood that the database 113, processor 115, and/or other databases and/or other processors are not limited to interfacing with the computer 112 using the network interface 117 and may interface with the computer 112 in any means sufficient to create a communications path between the computer 112 and database 113, the processor 115, and/or other databases and/or other processors. For example, the database 113 may interface with the computer 112 via a USB interface while the processor 115 may interface via some other high-speed data bus without using the network interface 117. The computer 112, the processor 115, and other processors may be integrated into a multiprocessor distributed system.

Although the computer 112 is shown as a platform on which the methods discussed and described herein may be performed, the methods discussed and described herein may be performed on any platform, for example, on any device that has computing capability. For example, the computing capability may include the capability to access communications bus protocols such that the user may interact with the many and varied computers 112, processors 115, and/or other databases and processors that may be distributed or otherwise assembled. These devices may include, but are not limited to, supercomputers, arrayed server networks, arrayed memory networks, arrayed computer networks, distributed server networks, distributed memory networks, distributed computer networks, desktop personal computers (PCs), tablet PCs, hand held PCs, laptops, devices sold under the trademark names BLACKBERRY™, PALM™, SAMSUNG™, or APPLE™, cellular phones, hand held music players, or any other device or system having computing capabilities.

Programs or software may be stored in the memory 111, and the central processing unit 114 may work in concert with the memory 111, the input device 116, and the output device 118 to perform tasks for the user. The memory 111 may include, but is not limited to, any number and combination of memory devices that are currently available or may become available in the art. For example, the memory devices may include, but are not limited to, the database 113, other databases and/or processors, hard drives, disk drives, random access memory, read memory, electronically erasable programmable read memory, flash memory, thumb drive memory, and any other memory device. Those skilled in the art are familiar with the many variations that may be employed using memory devices, and no limitations should be imposed on the embodiments herein due to memory device configurations and/or algorithm prosecution techniques. The memory 111 may store an operating system (OS) and/or any software of the computer assisted device capable of providing the digital design 105. The operating system may facilitate, control, and execute the software using a central processing unit 114. Any available operating system may be used in this manner including WIIDOWS™, LINUX™, Apple OS™ UNIX™ and the like. The central processing unit 114 may execute the software from a user requests or automatically.

Referring still to FIG. 1, the deposition device 120 may be or include any device capable of fabricating the component 100 using the digital design 105 as a template or guide. The deposition device 120 may fabricate the component 100 from the digital design 105 of the CAD assembly 110 in one or more processes, for example, by fabricating separate pieces of a component and then assembling the separate pieces together to form the component. Any suitable deposition device 120 may be used. Suitable commercially available deposition devices 120 include, but are not limited to, PROJET 1000™, PROJET 1500™, PROJET SD 3500™, PROJET HD 3500®, PROJET HD 3500PLUS™, PROJET 3500 HDMAX™, PROJET CP 3500™, PROJET CPX 3500™, PROJET CPX 3500PLUS™, PROJET 3500 CPXMAX™, PROJET7000™, PROJET6000™, PROJET5000™, PROJET DP 3500™, PROJET MP 3500™, ZPRINTER10™, ZPRINTER 250™, ZPRINTER350™, ZPRINTER 450™, ZPRINTER 650™, and/or ZPRINTER850™, which are available from 3D Systems Corp and S-MAX, S-PRINT, M-PRINT, M-FLEX, and/or X1-LAB, which are available from The ExOne Company.

Further, the material 130 used to form the component 100 is flowed through the nozzle 140 of the deposition device 120 in sequential layers to build the geometry of the digital design 105. However, different forms of material may be deposited in layers or in volumes other than continuous layers using various types of deposition devices to build the geometry of the digital design 105. For example, material deposition by a deposition device may include spraying of gels, liquids or slurries, printing of gels, slurries or solids, spreading of solids or gels, fusing of liquids or solids, melting of solids and solidification of liquids using a wide range of techniques. The deposition device 120 may deposit one or more second or subsequent layers having dimensions corresponding to the dimensions of the adjacent and previously deposited layer, such that the cross sectional shape of the finished component is uniform along the height of the component. In other embodiments, a deposition device may deposit one or more second or subsequent layers having dimensions that are different from the dimensions of the adjacent and previously deposited layer, such that the dimensions and/or the cross sectional shape of the finished component may vary along its height.

In some embodiments, multiple types of material may be applied as a single layer by multiple passes of a deposition device. For example, a first material composition may be deposited by a deposition device in a first region of a layer, and a second material composition may be deposited by a separate pass of the deposition device in a second region of the layer, such that the deposited layer has at least two distinct regions formed of the first material and the second material. In other embodiments, two or more materials may be deposited in a single pass of a deposition device. For example, a deposition device may have two or more nozzles, where each nozzle may deposit a different material in a different region of the layer during a single pass. In another example, a deposition device may have two or more nozzles, where each nozzle may deposit a different material simultaneously during a pass to form a layer of composite material, e.g., a combination of ceramic material and an adhesive or an organic binder.

According to embodiments of the present disclosure, a method of manufacturing a component for use in a high pressure press may include depositing a first layer on a substrate, the first layer having a first composition, and depositing multiple sequential layers at least partially adjacent the first layer, whereat least a portion of each of the multiple sequential layers have the same composition as adjacent portions of adjacent layers. As used herein, a substrate may refer to a platform or base that is separate from but supports the component as it is manufactured, or a substrate may refer to any layer of the component that has a second or subsequent layer deposited thereon, depending on the stage of manufacture. For example, a first step of manufacturing a component may include depositing a first layer on a substrate or base that is separate from the component, and in a second step of manufacturing the component, the first layer may be the substrate for a second or subsequent layer deposited thereon. However, in some embodiments, subsequent volumes of one or more material may be deposited in lines, discrete volumes, or other patterns not forming a continuous layer on a substrate in order to build a component geometry.

In another embodiment, a binder material is sprayed on and joins particles in the locations where the object is to be formed. After the application of the adhesive or binder, another layer of material composition may be spread across the additive manufacturing instrument and then another pass of a binder or adhesive may be applied on the designated areas of the new material composition layer to form a second layer of the mold or component. The process of layering the material composition followed by applying a binder or adhesive to the designated areas may be repeated until all the layers required to form the mold or component are deposited. The molds or components may then be harvested or removed from the build box for further processing or as finished molds or components. The support gained from the powder bed (i.e., the regions of powder that do not include the adhesive or binder) allows overhangs, undercuts, and internal volumes to be created as long as there is a hole or pathway for the loose powder to escape.

At least one binder may be provided during manufacturing to bind the first layer and multiple sequential layers together to form the component geometry. For example, a binder may be a component of or mixed within the material being deposited, such that the binder is deposited simultaneously with the material being deposited by the deposition device, or a binder may be deposited separately from the remaining material being deposited. After building the component geometry, one or more of the at least one binder may be removed from the component, for example, by heating or by chemical decomposition.

Suitable organic binders may be or include one or more waxes, resins or other organic compounds that are insoluble, or at least substantially insoluble, in water. Waxes may include, for example, animal waxes, vegetable waxes, mineral waxes, synthetic waxes, or any combination thereof. Illustrative animal waxes may include, but are not limited to, bees wax, spermaceti, lanolin, shellac wax, or any combination thereof. Illustrative vegetable waxes may include, but are not limited to, carnauba, candelilla, or any combination thereof. Illustrative mineral waxes may include, but are not limited to, ceresin and petroleum waxes (e.g., paraffin wax). Illustrative synthetic waxes may include, but are not limited to, polyolefins (e.g., polyethylene), polyol ether-esters, chlorinated naphthalenes, hydrocarbon waxes, or any combination thereof. The organic binder may also include other organic compounds that are soluble or insoluble in organic solvents. Illustrative compounds that may include, but are not limited to, polyglycol, polyethylene glycol, hydroxyethylcellulose, tapioca starch, carboxymethylcellulose, polypropylene carbonate, or any combination thereof. Illustrative organic binders may also include, but are not limited to, starches, and cellulose, or any combination thereof. The organic binders may also include, but are not limited to, microwaxes or microcrystalline waxes. Microwaxes may include waxes produced by de-oiling petrolatum, which may contain a higher percentage of isoparaffinic and naphthenic hydrocarbons as compared to paraffin waxes. Resins may include materials derived from plants containing terpenes, resin acids, gums and other compounds including plant oils, saps or mucilage. Synthetic compounds with similar chemistry to naturally derived materials may also be used. Other suitable binders may include, for example, sodium silicate, acrylic copolymers, arabic gum, portland cement and the like. Binders may be deposited in solid or liquid form.

Selected materials may be deposited in different regions of a component for use in a high pressure press, depending on, for example, the type of component being made, the type of high pressure press, and the desired properties of the component. For example, according to some embodiments, one or more layers being deposited to form a component of a high pressure press may include a first material composition and a second material composition, where the first material composition and the second material composition are different and form distinct regions of the one or more layers. The distinct regions may provide desired properties to different parts of the component. For example, a component of a high pressure press manufactured according to some embodiments may include a region having relatively higher thermal insulation properties, a region having a relatively higher coefficient of friction, and/or an electrically conductive region. Whereas a component having regions of different material properties would have otherwise been manufactured by assembling separate pieces together or by performing subsequent material treatments, distinct regions of a component according to embodiments of the present disclosure may be formed using a single additive manufacturing process disclosed herein, thereby allowing the component to be formed as a single structure having at least one distinct region of material with a different material property than the remaining region(s) of the component.

Further, in some embodiments, a component of a high pressure press may include one or more regions made of a single material having varying density. For example, referring now to FIGS. 2 and 3, an axial and radial cross sectional view, respectively, of a component 200 for a high pressure press are shown, where the component 200 has a first region 210 made of a material having a greater density than the material forming a second region 220. The component 200 is a container that has a body 202 and a receiving cavity 204 opening to at least one outer surface 206 of the body 202. The body 202 has a height 208 measured parallel to a central axis 201 of the component 200. At least one material forming the component 200 has a uniform density along the entire height 208 of the body 202. In the embodiment shown, the material forming the second region 220 of the component 200 has a uniform density along the entire height 208 of the body 202. The material forming the first region 210 of the component may have a uniform density throughout the first region 210. However, as the first region 210 extends a partial height of the body 202, the material forming the first region 210 has a uniform density along the partial height of the body 202.

The material forming the first region 210 and the material forming the second region 220 may be the same material type, but may be deposited by additive manufacturing methods of the present disclosure to have different densities, such as by varying the amount of binder provided with the material. For example, the material type forming multiple regions may have a relatively higher ratio of binder mixed therein to form a relatively less dense region and a relatively lower ratio of binder mixed therein to form a relatively denser region of the component. At least some of the binder may be subsequently removed, e.g., by heating or by chemical decomposition, thereby leaving the region formed with a relatively higher ratio of binder to have a greater porosity than the region formed with a relatively lower ratio of binder. In such embodiments, the different porosity resulting in the different regions may create regions made of the same material type but having different densities. In some embodiments, discrete amounts of binder may be deposited interspersedly with a single material type by a deposition device, where a relatively greater number of or larger volume of discrete amounts of binder are provided to create a region having a relatively lower density than the remaining region(s). In some embodiments, different ratios of a composite material may be used to form regions of relatively denser material, for example, by including a larger ratio of a denser constituent of the composite material to form the denser material region. In yet other embodiments, different material types may be used to form regions having different densities.

Figure 4:
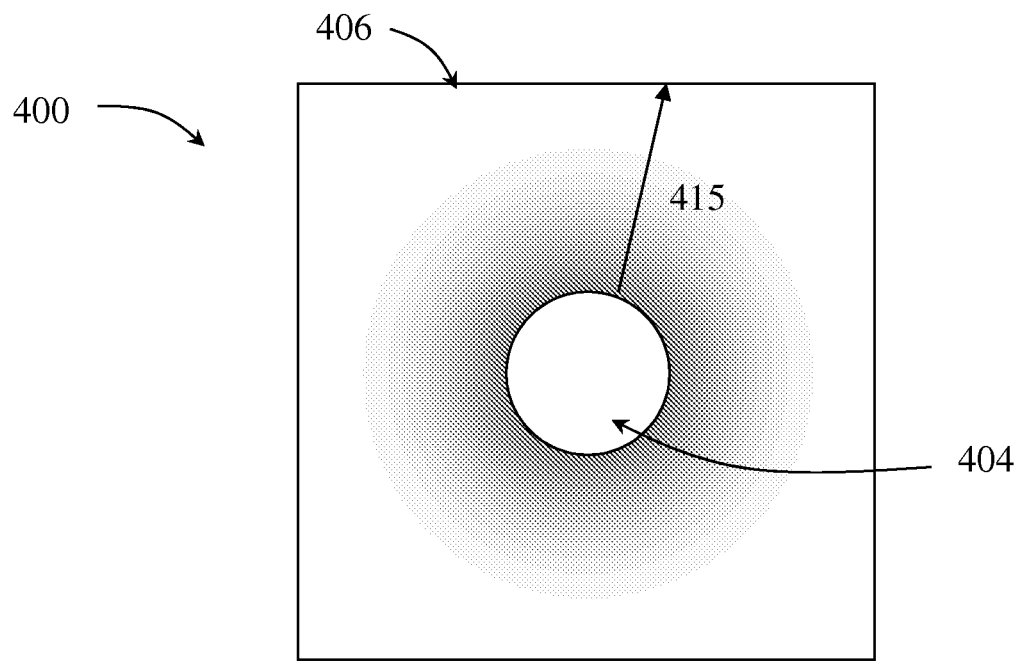
FIG. 4 shows a radial cross-sectional view of a component according to embodiments of the present disclosure.
Figure 5:
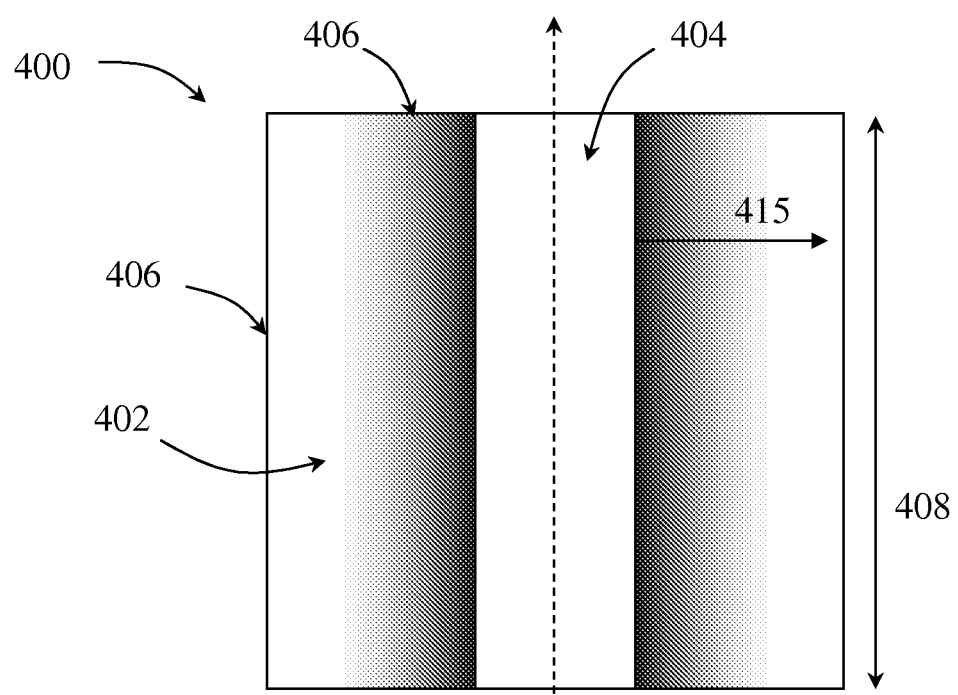
FIG. 5 shows an axial cross-sectional view of a component according to embodiments of the present disclosure.

According to some embodiments of the present disclosure, a component may have a continuously changing density rather than discrete regions of material having different densities. For example, FIGS. 4 and 5 show a radial and axial cross sectional view, respectively, of a component 400 for a high pressure press formed of at least one material having a continuously decreasing density along a radial direction 415 away from the central axis 401 and towards an outer surface 406 of the component. The component 400 shown is a container that has a body 402 and a receiving cavity 404 opening to at least one outer surface 406 of the body 402. The body 402 has a height 408 measured parallel to the central axis 401 of the component 400. At least one material forming the component 400 provides a continuously changing or gradient density along a radial direction 415 from the central axis 401 towards at least one outer surface 406 of the component. As shown, the radial direction 415 extends perpendicular to the central axis 401. However, in other embodiments, a gradient of one or more material properties may extend in other directions, for example, axially, radially increasing, angled from an axis, or combinations of multiple directions, for example, a gradient may be formed in directions extending outwardly from the core or center of a component.

Further, the gradient density is formed along the entire height 408 of the body 408, such that the density of the material is substantially uniform along the entire height 408. In other words, the density of the material along the inner wall of the receiving cavity 404 is substantially uniform along the entire height 408 of the component, the density of the material along at least one outer surface 406 is substantially uniform along the entire height 408 of the component, and the density of the material at radial positions between the inner wall of the receiving cavity 404 and an outer surface 406 is substantially uniform along the entire height 408 of the component.

Gradient densities or gradients of other material properties may be formed in a component of a high pressure press, for example, by depositing varying ratios of constituents of a composite material, or by depositing varying particle sizes of a monolithic or composite material, layer by layer to build the geometry of the component. In some embodiments, a deposition device may have multiple nozzles, where each nozzle deposits a different constituent of a composite material or different particle sizes of a material at a changing rate to form one or more layers the component geometry. For example, in some embodiments, a constituent of a composite material may be deposited throughout a layer in gradually changing amounts by a nozzle of a deposition device, while one or more other nozzles of the deposition device may deposit other constituents of the composite material in varying amounts, thereby creating a composite material layer with a gradually changing ratio of constituents. The amount of a first constituent deposited relative to remaining constituents of a composite material may range from depositing 100% of the first constituent and 0% of the remaining constituents to form part of a layer to depositing 0% of the first constituent and 100% of the remaining constituents to form part of the layer, with any ratio therebetween of the constituents. In other embodiments, a deposition device having more than one nozzle may be used to deposit varying ratios of particle size throughout a single layer, where one nozzle may deposit a material having one distribution of particle sizes and another nozzle may deposit a material having a different distribution of particle sizes.

Particle size distributions for materials deposited by deposition devices may depend, for example, on the type of material being deposited, the region of the component being formed, the type of deposition device used, and the amount of porosity desired in the component design. Particle sizes may range from nano-sized, micro-sized and larger. For example, in some embodiments, particles being deposited may range from less than 1 micron, from 1-10 microns, from greater than 10 microns, and greater than 100 microns, where various sub-ranges thereof may be used alone or in combination to form a layer of material being deposited. In addition, the distribution of particle sizes may be monomodal or multimodal, e.g. bimodal. The standard deviation of the particle size distribution may also be tailored or varied for a specific purpose.

Suitable materials for forming a component of a high pressure press may include, for example, at least one of a ceramic material, minerals, graphite, a thermally insulating material (described more below), a gasketing material (described more below), a conductive material and combinations thereof. For example, a composite material including a clay mineral powder and at least one type of ceramic material or hard material may be used to form at least a portion of a component for a high pressure press. Suitable clay or clay-like phyllosilicate minerals may include akermanite ($Ca_2MgSi_2O_7$), betrandite ($Be_2Al_2Si_6O_{16}$), kaolinite (($Al_4Si_6$)$_{10}$(OH)$_8$), montmorillonite (Na, Ca)$_{0.33}$(Al, Mg)$_2$($Si_4O_{10}$)(OH)$_2$.n($H_2O$), pyrophylite ($Al_4Si_4O_{10}$(OH)$_2$), rehnite (($Ca_2Al_2Si_3O_{10}$(OH)$_2$), scolecite ($CaAl_2Si_2O_7$-3$H_2O$), serpentine ($Mg_3Si_2O_5$(OH)$_4$), high alumina talc, low alumina talc, zoisite ($Ca_2A_{13}Si_3O_{12}$(OH)$_2$) and the like. Examples of ceramic material that may be used include but are not limited to silica ($SiO_2$), alumina ($Al_2O_3$), iron oxide ($Fe_3O_4$), silicon carbide (SiC), silicon nitride ($Si_3N_4$), zirconia ($ZrO_2$) and the like. Examples of useful hard minerals may include pyrope ($Mg_3Al_2Si_3O_{12}$), corundum ($Al_2O_3$), zircon ($ZrSiO_4$), kayanite ($Al_2SiO_5$), olivine ((Mg, Fe)$_2SiO_4$), enstatite ($MgSiO_3$) and similar minerals. Other suitable materials for forming a component of the present disclosure may be found, for example, in U.S. Pat. No. 5,858,525, which is incorporated herein by reference.

Components of a high pressure press may have complex designs of two or more regions formed through one or more additive manufacturing processes of the present disclosure, thereby allowing for component designs that would otherwise not be as easily created or in some cases possible. Referring again to FIGS. 2 and 3, component 200 has a first region 210 embedded within a second region 220, such that the first region 210 and the second region 220 form a flush or smooth inner wall 205 that defines receiving cavity 204. Particularly, as shown, first region 210 extends and forms a partial height of the receiving cavity inner wall 205, and second region 220 extends along and forms the remaining height of the receiving cavity inner wall 205. The portion of the receiving cavity 204 formed by the first region 210 has a diameter substantially equal to the portion of the receiving cavity 204 formed by the second region 220, such that the receiving cavity 204 has a substantially uniform diameter 207 along the entire height of the inner wall 205.

Figure 2:
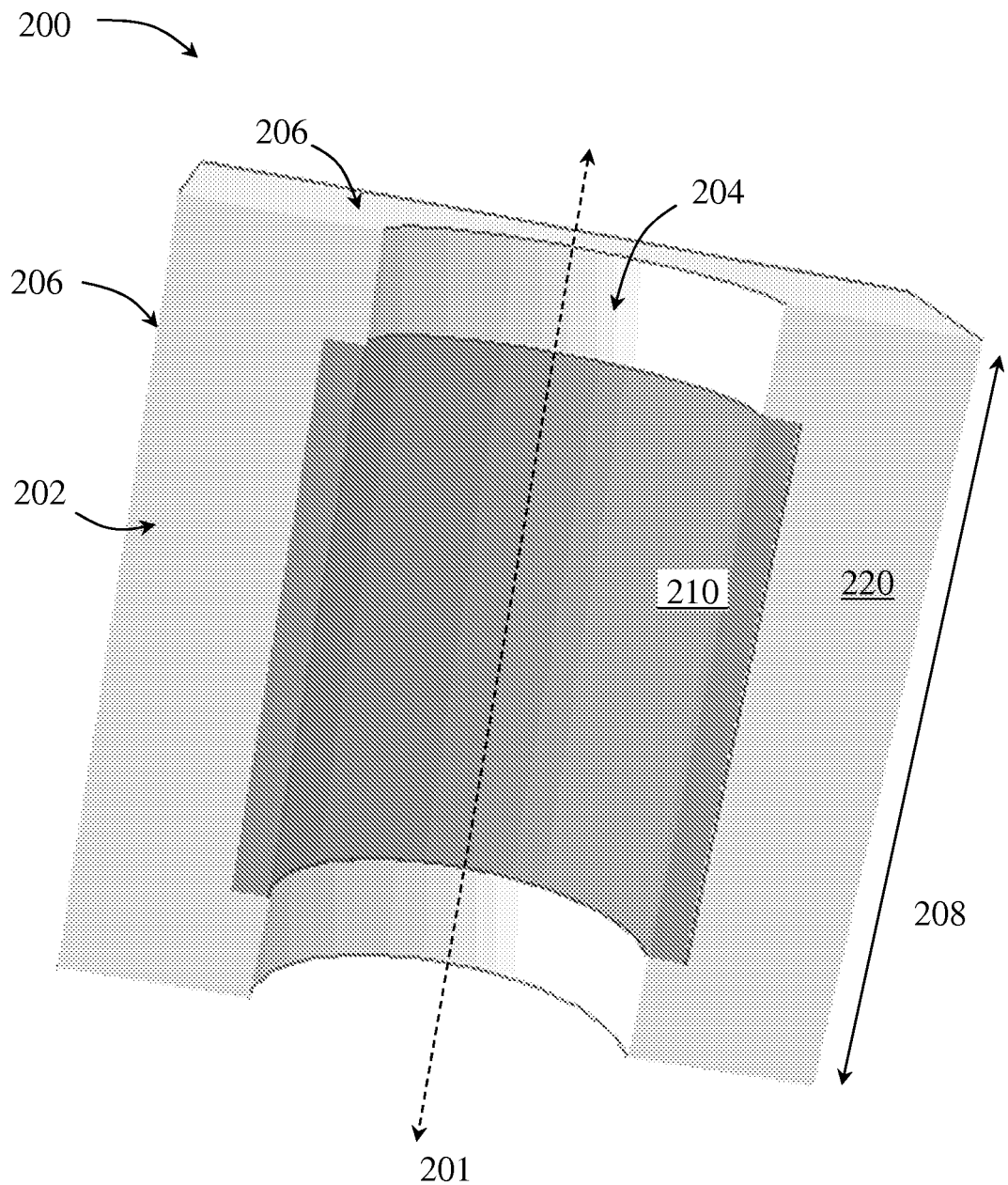
FIG. 2 shows a cross-sectional view of a component according to embodiments of the present disclosure.
Figure 3:
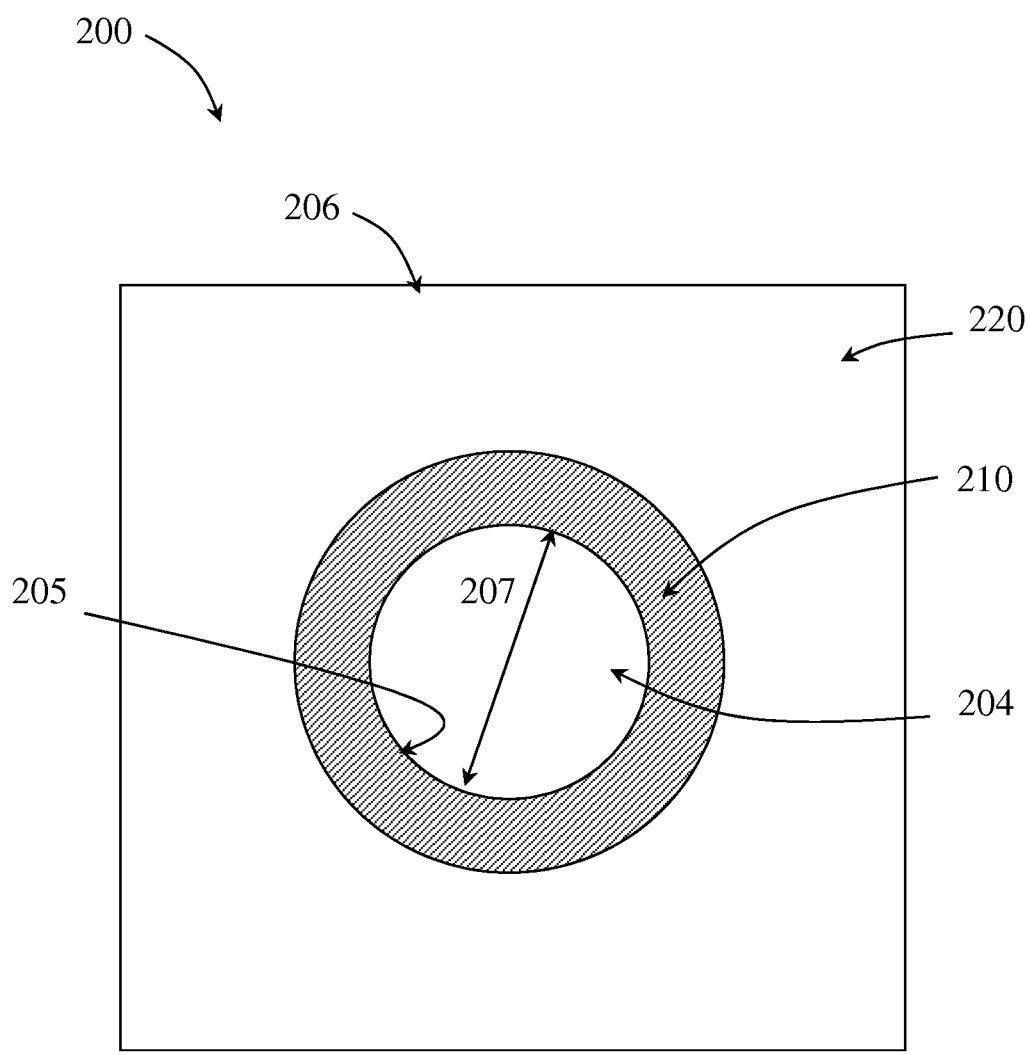
FIG. 3 shows a cross-sectional view of a component according to embodiments of the present disclosure.
Figure 13:
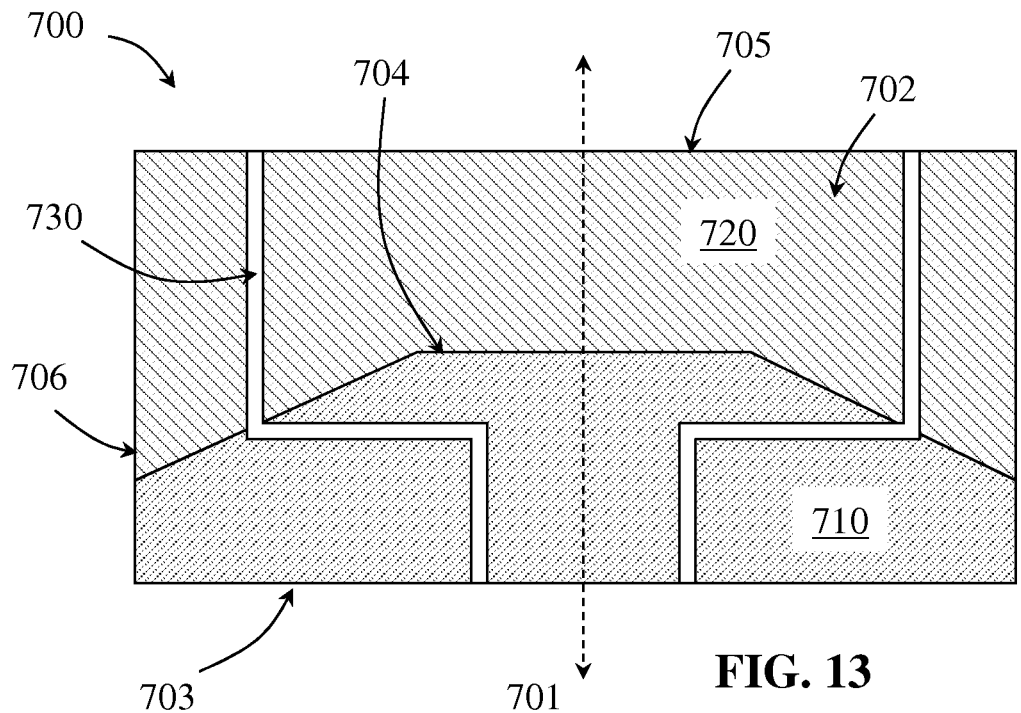
FIG. 13 shows a cross-sectional view of a component according to embodiments of the present disclosure.
Figure 14:
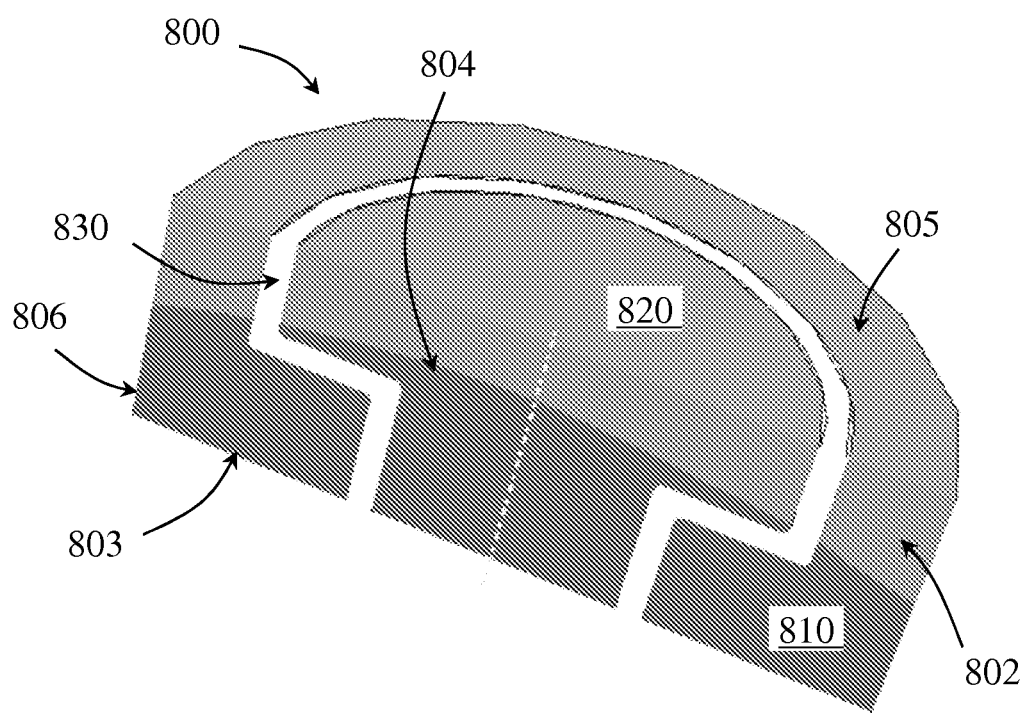
FIG. 14 shows a cross-sectional view of a component according to embodiments of the present disclosure.

In contrast to other methods of forming a component having concentric pieces, methods of the present disclosure may be used to manufacture a component that has concentric regions formed together as a single piece, where each region may provide a different material property, as well as being capable of manufacturing the regions to have corresponding and mating geometries, for example, as shown in FIGS. 2 and 3 where the first region 210 has a geometry that mates within a corresponding recessed geometry of the second region 220. FIGS. 6-14 show additional examples of components having regions with corresponding and mating geometries. However, other embodiments of components formed of two or more regions having corresponding and mating geometries may be envisioned and formed according to methods of the present disclosure. Further, by using methods of the present disclosure to form high pressure press components, a component may be formed having multiple regions with mating and interlacing geometries, for example, as shown in FIGS. 13 and 14, without segmenting one or more of the regions. In other words, instead of forming a component with multiple interlacing regions (having complex, interlocking or intertwining geometries) by segmenting the regions and assembling them together piece by piece, methods of the present disclosure may allow multiple interlacing regions to be formed together as a single body or structure.

Figure 6:
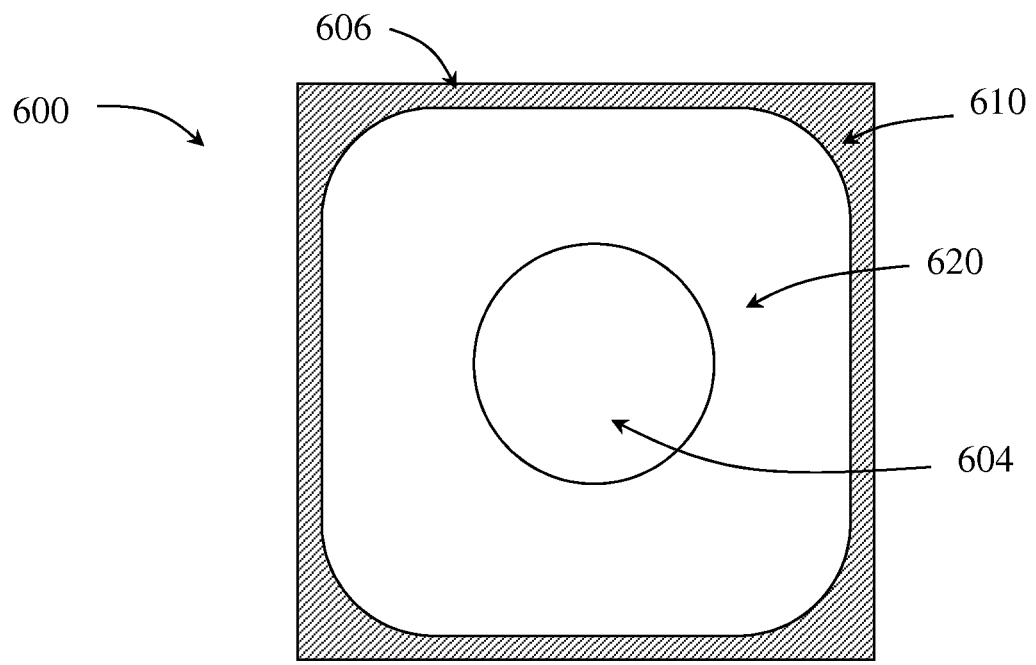
FIG. 6 shows a radial cross-sectional view of a component according to embodiments of the present disclosure.
Figure 7:
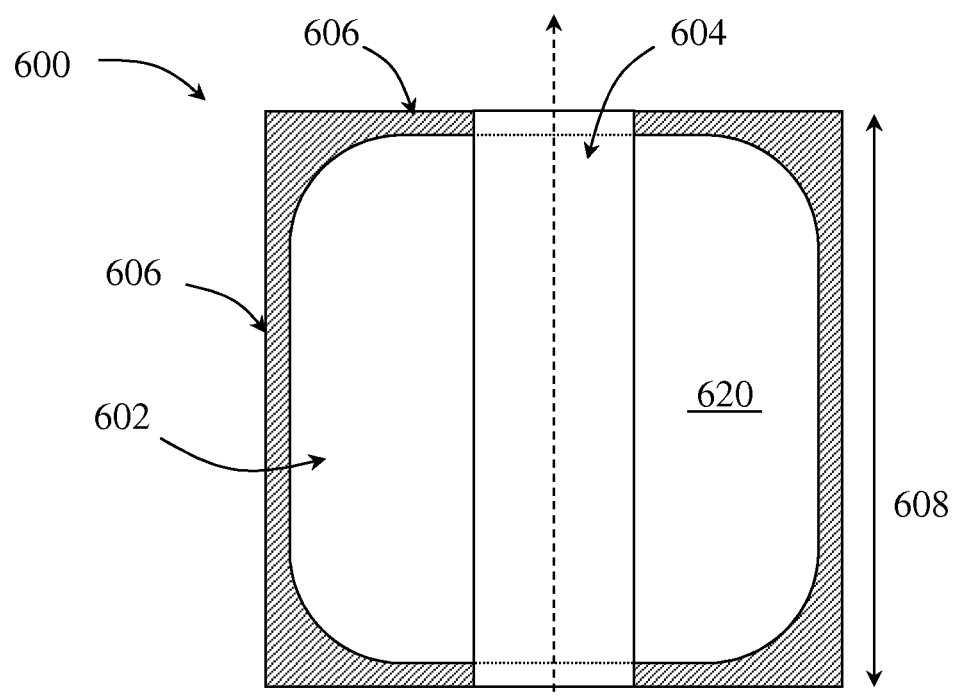
FIG. 7 shows an axial cross-sectional view of a component according to embodiments of the present disclosure.
Figure 8:
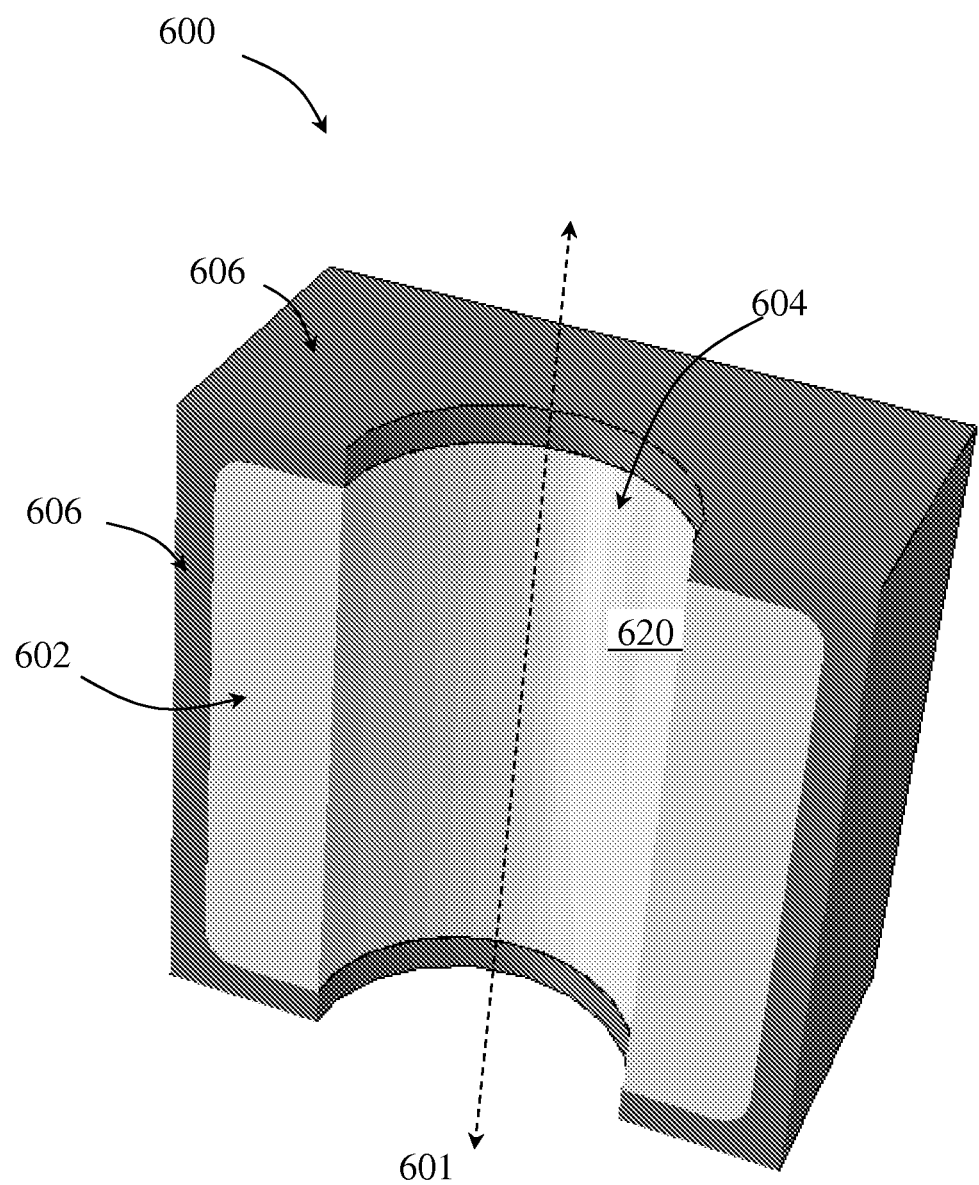
FIG. 8 shows an axial cross-sectional view of a component according to embodiments of the present disclosure.

Referring now to FIGS. 6-8, a component 600 of a high pressure press according to embodiments of the present disclosure is shown. The component 600 is a container that has a body 602, a central axis 601 and a receiving cavity 604 opening to at least one outer surface 606 of the body, where the height 608 of the body is measured along the central axis 601. The body 602 may be formed of at least one material having a uniform density along the entire height 608 of the body 602. For example, as shown, the component 600 has a first region 610 formed of a first material and a second region 620 formed of a second material, where the first material has a uniform density along the height 608 of the body 602. Further, the first region 610 and second region 620 may have at least one property difference therebetween. In the embodiment shown, the two regions 610, 620 are formed of different materials, where the first region 610 may be formed of a gasketing material and the second region 620 may be formed of a composite material including constituents selected from at least one mineral, ceramic material and binder. However, in other embodiments, at least two regions of a component may be formed of the same material type, but have different material properties, such as hardness, or density. For example, at least two regions of a component may be formed of the same material type but have different particle sizes.

By forming at least one region of the component from a gasketing material, the selected region(s) may act as a built-in gasket during use in a high pressure press. For example, a component having a gasketing material region that forms at least one outer surface, and in some embodiments forming each outer surface of the component, may exhibit sealing properties during pressing operations without the use of a separate seal or gasket. Particularly, during pressing operations in a high pressure press, the gasketing material forming at least one outer surface region of the component may flow outwardly into gaps between advancing anvils of the high pressure press, thereby sealing the pressure within the component being pressed. Thus, suitable gasketing material should be sufficiently deformable to transmit pressure from the high pressure press to the sample being pressed, and also sufficiently strong to seal pressure within the component and resist being extruded entirely. If the gasketing material has low shear strength and good flow properties, it may provide good gasket sealing and flow, but it may be difficult to generate higher pressures due to excessive gasket flow. If a stronger, less flowable gasketing material is used, higher pressures can be generated, but the material may be unstable during compression and/or decompression. For example, the gasketing material may stick during decompression and then flow in a sudden release of pressure. When a single material is used to make up the container assembly, these demands on the material may be in conflict.

Suitable gasketing materials may include materials having good flow properties at low pressures and that demonstrate an increase in shear strength at high pressures. For example, a gasketing material may include clay minerals, phyllosilicate, e.g., pyrophyllite or talc, or a synthetic material made of a combination of one or more of earth materials, ceramics, and glasses.

In the embodiment shown, the first region 610 forms each outer surface 606 of the component 600, and including the edges and corners of the container. However, in other embodiments, a component may have a first region forming one, two, three, four or more outer surfaces of the component. Further, by using additive manufacturing methods of the present disclosure to form component 600, the first region formed of a gasketing material may have an increased thickness. For example, a first region formed of gasketing material may have a thickness ranging from about $\frac{1}{100}$ to about $\frac{1}{4}$ the thickness of a second radially inward region, where thickness is measured in the radial direction from the central axis 610. In some embodiments, the thickness of a first region formed of gasketing material may have a thickness ranging from less than $\frac{1}{10}$ the thickness of a second radially inward region.

Further, in some embodiments, a component may have at least one region formed of at least one material with a uniform density along the entire height of the component, where the at least one region forms one, two, three, four or more outer surfaces of the component. For example, a component may have a first region made of a gasketing material, where the gasketing material has a uniform density along the entire height of the component, and where the first region forms at least one outer surface of the component.

Referring still to FIGS. 6-8, the first region 610 and second region 620 have mating geometries, where the second region 620 fits within a recessed geometry of the first region 610. Further, the first and second regions 610, 620 may each form a portion of an inner wall defining the receiving cavity 604 shape. As shown, the receiving cavity 604 is a through-hole having two openings on opposite outer surfaces 606 of the body 602. Further, the receiving cavity 604 has a substantially constant diameter along the entire height 608 of the receiving cavity 604, such that the diameter of the inner wall formed by the first region 610 is substantially equal to the diameter of the inner wall formed by the second region 620. However, in other embodiments, a receiving cavity may have a different shape. For example, a receiving cavity may have one opening or more openings to an outer surface of a component body. In some embodiments, a receiving cavity may have a cylindrical and/or a non-cylindrical shape. For example, a receiving cavity may have one or more portions with a cylindrical shape, different portions having differently sized cylindrical shapes, one or more portions with a non-cylindrical shape, or a combination of different sized and/or shaped portions. In some embodiments, a portion of a receiving cavity may have a spherical shape. In some embodiments, at least a portion of a receiving cavity may have a rectangular prism shape.

Component 600 may be formed using an additive manufacturing process according to embodiments of the present disclosure, where a deposition device deposits multiple sequential layers made of the first and second materials to build up the geometry of the component with the first and second materials in selected regions of the component. Particularly, a first layer may be deposited on a substrate, where the first layer is made of the first material composition. Multiple sequential layers may be deposited at least partially adjacent the first layer, where at least a portion of each of the multiple sequential layers have the same material composition as adjacent portions of adjacent layers. For example, as the deposition device begins to deposit layers having both the first material and the second material, the first material is adjacent to at least a portion of the first material deposited in the previously applied and adjacent layer. A deposition device may deposit the first material and second material in distinct regions of one or more layers to build the geometry of the first and second regions 610, 620 of the component 600. Each of the first and second materials may be selected from, for example, a ceramic material, minerals, graphite, a thermally insulating material and a friction material. Further, at least one binder is provided during the additive manufacturing process to bind the first layer and multiple sequential layers to form the component.

Figure 9:
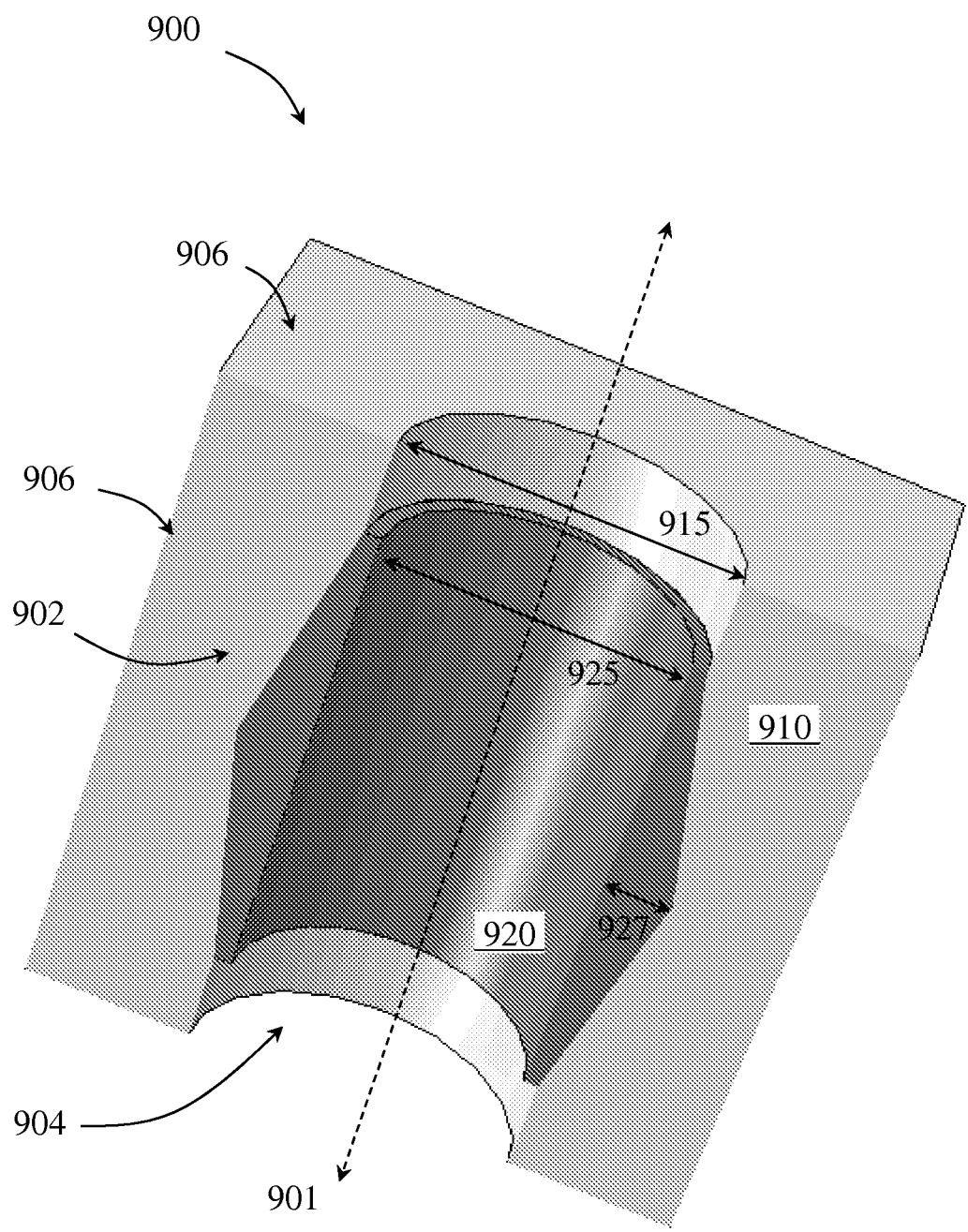
FIG. 9 shows an axial cross-sectional view of a component according to embodiments of the present disclosure.

Referring now to FIG. 9, a cross-sectional view of a component 900 of a high pressure press is shown. The component 900 is a container that has a body 902 with a height 908 measured along a central axis 901, and a receiving cavity 904 opening to at least one outer surface 906 of the body 902. As shown, the body has a first region 910 and a second region 920, where the regions 910, 920 have at least one property difference. The first region 910 may be formed of at least one material having a uniform density along the entire height 908 of the body 902. The second region 920 may be made of a thermally insulating material or graphite and forms at least a portion of an inner wall defining the receiving cavity 904. The remaining geometry of the second region 920 at least partially mates with and fits within a corresponding recessed geometry of the first region 910. Particularly, as shown, the geometry of the second region 920 may have a gradually decreasing thickness 927 in the axial direction from the central region of the component towards the outer surfaces of the component, where the thickness is measured between the second region inner surface that defines a portion of the receiving cavity 904 and the second region outer surface that interfaces with the first region 910. However, one or more regions may have other geometries including varying thicknesses along the height of the region. Further, each of the first and second regions 910, 920 forms at least a portion of the receiving cavity 904, where the portions formed by the first region 910 have a diameter 915 larger than the diameter 925 of the portion formed by the second region 920, thereby forming a receiving cavity 904 having a generally cylindrical shape with multiple sizes.

Figure 10:
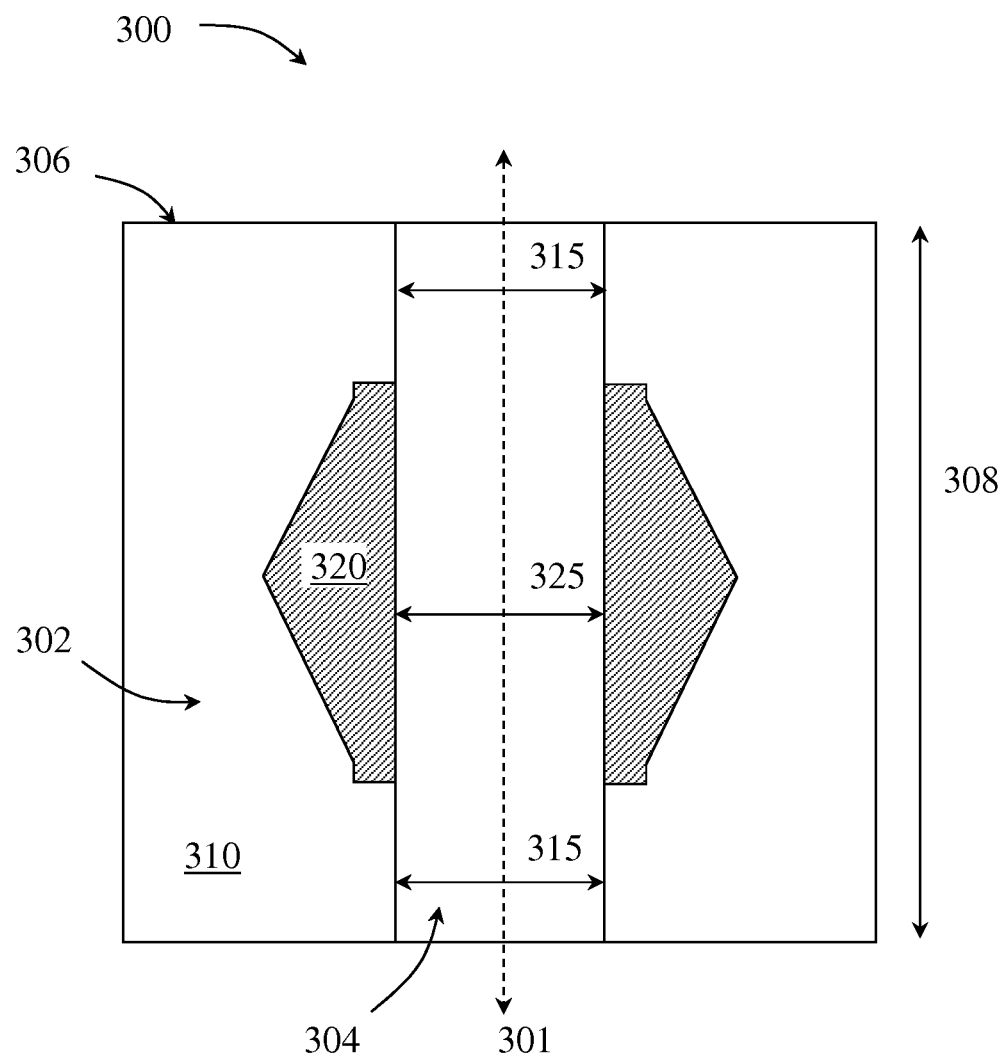
FIG. 10 shows an axial cross-sectional view of a component according to embodiments of the present disclosure.

However, in other embodiments, a receiving cavity may have a generally cylindrical shape with a uniform diameter along its height. For example, as shown in FIG. 10, a component 300 has a body 302 with a height 308 measured along a central axis 301, and a receiving cavity 304 opening to at least one outer surface 306 of the body 302. The body has a first region 310 and a second region 320 having at least one property difference therebetween, where each region forms a portion of the receiving cavity 304. Particularly, the second region 320 forms a portion of the inner wall defining the receiving cavity having a diameter 325 that is substantially equal with the diameter 315 of the portions of the receiving cavity formed by the first region 310. The remaining geometry of the second region 320, which includes a varying thickness along its height, mates with and fits within a corresponding shaped recess geometry of the first region 310.

The first region 310 may be formed of at least one material having a uniform density along the entire height 308 of the body 302, and may include, for example, at least one of a mineral and ceramic composite, a thermally insulating material, or a gasketing material. The second region 320 may be made of a thermally insulating material or graphite and forms at least a portion of an inner wall defining the receiving cavity 304. However, in other embodiments, components may have different combinations of materials forming two or more regions of the component to provide different properties to those regions of the component. According to embodiments of the present disclosure, the component 300 may be formed by depositing the different material in selected regions of each layer to form the first and second regions 310, 320. For example, to deposit a layer forming part of both the first region 310 formed of a ceramic mineral composite and the second region 320 formed of graphite, a slurry containing graphite and a slurry containing a ceramic mineral composite may be deposited in areas of the layer corresponding to the first and second regions 310, 320.

Thermally insulating materials may include, for example, CsCl, CsBr, CsI or combinations thereof, $ZrO_2$, and optionally, additives that reflect and/or absorb thermal radiation such as electrically conductive or semiconductive particles or electrically conductive or semiconductive powders. For example, an additive may include conductive oxide (e.g., superconductive oxides, such as, $La_{1.85}Ba_{0.15}CuO_4$, $HgBa_2Ca_2Cu_3O_x$, $Bi_2Sr_2Ca_2Cu_3O_{10}$, $YBa_2Cu_3O_7$, semiconductors, such as Si, Ge and/or Sb, semiconductive carbides and/or nitrides (e.g., SiC, TiC and GaN). In some embodiments, an additive may include chromites, ferrites, metals, semiconductors, superconductive oxides and combinations thereof. For example, the additive may include chromite according to the formulas $LCrO_3$ or $M^ICr_2O_4$, wherein L is yttrium or a rare earth element, and $M^I$ is a transition metal, Mg or Li. Chromite may include $LaCrO_3$, $FeCr_2O_4$, $CoCr_2O_4$, $MgCr_2O_4$ or a combination thereof, or chromite may be doped with Mg, Ca, Sr or a combination thereof. In some embodiments, an additive may include ferrite according to the formula $M^{II}Fe_2O_4$ or $M^{III}Fe_{12}O_{19}$, wherein $M^{II}$ is a transition metal, Mg or Li, and $M^{III}$ is Ba, Sr, or combinations thereof. Ferrite may be of $Fe_3O_4$, $CoFe_2O_4$, $ZnFe_2O_4$, $BaFe_{12}O_{19}$, $SrFe_{12}O_{19}$, $Mn_aZn_{(1-a)}Fe_2O_4$, $Ni_aZn_{(1-a)}Fe_2O_4$, or a combination thereof, wherein a is in a range of 0.01 to 0.99, but the present disclosure is not limited thereto. In certain embodiments, the metal is a refractory metal such as Ti, V, Cr, Zr, Nb, Mo, Ru, Rh, Hf, Ta, W, Re, Os, Ir, Pt, or a combination thereof, or a metal having a relatively lower melting point, such as Bi, Sn, Pb or a combination thereof, but the present disclosure is not limited thereto. In other embodiments, non-limiting examples of the metals include Al, Fe, Mn, Ni, Co, Cu, B, Si, Be, Mg, Ca, Sr, Ba, Ga, In, Sn, Pb, Bi and combinations thereof. In certain embodiments, the additive includes electrically insulating particles. For example, an additive may include $ZrO_2$, MgO, CaO, $Al_2O_3$, $Cr_2O_3$, an aluminate (e.g., $FeAl_2O_4$) or a combination thereof.

Figure 11:
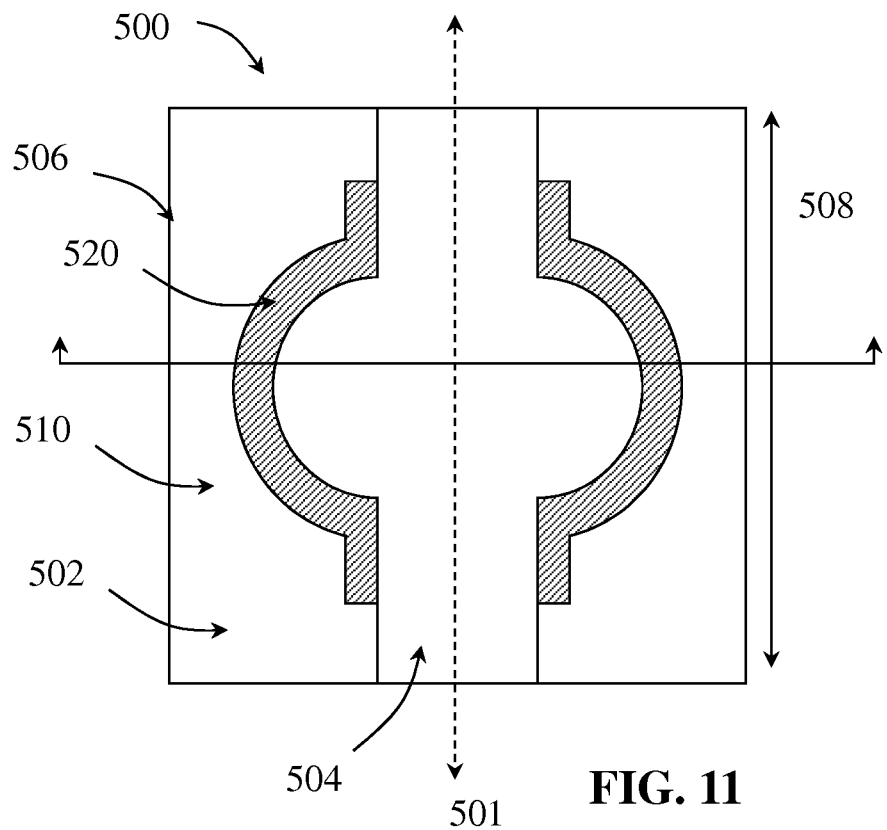
FIG. 11 shows an axial cross-sectional view of a component according to embodiments of the present disclosure.
Figure 12:
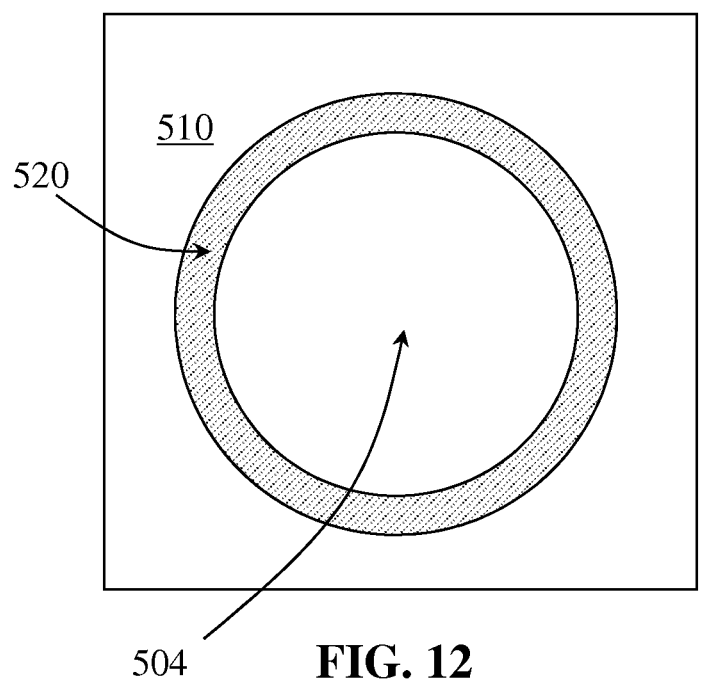
FIG. 12 shows a radial cross-sectional view of a component according to embodiments of the present disclosure.

FIGS. 11 and 12 show an axial and radial cross-sectional view, respectively, of a component according to embodiments of the present disclosure. The component 500 is a container that has a body 502 with a height 508 measured along a central axis 501, and a receiving cavity 504 opening to at least one outer surface 506 of the body 502. The receiving cavity 504 has a spherical shaped portion and two cylindrical shaped portions extending from the spherical shaped portion to the openings. However, other embodiments may have differently shaped receiving cavities. Further, as shown, the body has a first region 510 and a second region 520, where the second region 520 defines the spherical shaped portion of the receiving cavity and where the first region 510 surrounds the second region 520. The regions 510, 520 have at least one property difference there between, e.g., a difference in density, thermal conductivity or electrical conductivity. For example, the first region 510 may be formed of at least one material having a uniform density along the entire height 508 of the body 502, and the second region 520 may be made of a material that has either a greater density or a lesser density. Further, the second region 520 may be made of graphite or a material having low electrical resistivity such that the spherical shaped portion of receiving cavity 504 forms a heater tube having varying cross-sectional dimensions along the axial position of the receiving cavity 504, which may be done to tailor the heating resistance along the axial position of the receiving cavity and thereby obtain more uniform heating of the material being pressed within the receiving cavity. The geometry of the second region 520 at least partially mates with and fits within a corresponding recessed geometry of the first region 510.

Methods of the present disclosure may be used to make other high pressure press components having variable and complex geometry and/or variable composition. For example, FIGS. 13 and 14 show cross-sectional views components for a high pressure press referred to herein as an end button, which may be inserted into a receiving cavity of a container to close or seal a material being pressed within the receiving cavity. As shown in FIG. 13, a component 700 may have a central axis 701 and a body 702 formed of at least two discrete regions 710, 720, where each region is made of a material having at least one property difference there between. In the embodiment shown, the first region 710 may be positioned along a bottom surface 703 of the component, which may be inserted into a receiving cavity to interface with a material being pressed, and may be formed of a thermally insulating material. The second region 720 interfaces the first region 710 at interface 704 and extends to a top surface 705 (opposite bottom surface 703) of the component, and may be formed of a gasketing material. Interface 704 includes a plurality of intersecting planar geometries to form a non-planar interface. However, as shown in FIG. 14, other non-planar geometries, such as concave or convex shapes, may form a non-planar interface between two adjacent regions. According to other embodiments, other non-planar and/or planar geometries may form a non-planar or planar interface between two adjacent regions. In yet other embodiments, a gradient may be formed through a component (either a gradient of a material property, e.g., density, or a gradient between two different materials), such that two or more regions having at least one property difference there between do not have a defined interface between the two or more regions.

Further, at least one current path 730 extends in multiple directions through the first region 710 and the second region 720. Particularly, as shown, current path 730 extends radially and axially through the first region 710 and the second region 720. Current paths may be formed of a conductive material, such as one or more conductive materials, e.g., molybdenum, copper, steel or other materials with low resistivity. Alternatively, conductive materials with higher resistivity such as titanium, zirconium or lanthanum chromate ($LaCrO_3$) may be used to obtain higher levels of heating. Different materials may be used in combination in order to tailor the resistance (and thus electrical heating) characteristics of the component so that the heating pattern within the cell is optimized.

As shown in FIG. 14, a component 800 may have a body 802 formed of at least two discrete regions 810, 820, where each region is made of a material having at least one property difference there between. In the embodiment shown, the first region 810 may be positioned along a bottom surface 803 of the component, which may be inserted into a receiving cavity to interface with a material being pressed, and may be formed of a thermally insulating material. The second region 820 interfaces the first region 810 at a non-planar interface 804 and extends to a top surface 805 (opposite bottom surface 803) of the component, and may be formed of a gasketing material. Side surface 806 extends around the circumference of the component 800, defining a radial cross-sectional shape of the component. The circular cross-sectional shape of component 800 may correspond with the cross-sectional shape of an opening to a receiving cavity, such that component 800 may be inserted within the receiving cavity of another component. According to other embodiments, such as the embodiment shown in FIG. 13, a side surface 706 may define a non-circular cross-sectional shape along a plane perpendicular to the central axis 701.

According to embodiments of the present disclosure, current paths may extend through one or more regions of a component in a complex or multi-direction path, which may minimize outgoing heat flow and allow the current to be focused at the point of entry into the heated portion of the component. For example, as shown in FIGS. 13 and 14, a current path may extend in multiple directions between opposite outer surfaces of a component and through multiple regions of material having at least one property difference there between. The regions surrounding the current path may include an internal layer (e.g., including the surface that interfaces with a material to be pressed) that functions as a thermal insulator and an outer layer (e.g., the second regions shown in FIGS. 13 and 14) that is optimized for gasketing. Heat may be directed through the outer layer and internal layer to a material that is being pressed via the current paths during high pressure high temperature pressing. The insulating material forming the internal layer (e.g., the first regions shown in FIGS. 13 and 14) may help to keep the heat around the material being pressed, while a gasketing material forming an outer layer may be used to seal the component. By using additive manufacturing processes to form such components, complex geometries of variable material, such as the conductive material forming multi-directional current paths through the regions of gasketing material and thermally insulating material shown in FIGS. 13 and 14, may be incorporated into the component. Further, the density of the thermally insulating material may be uniform throughout the first region, and/or the density of the gasketing material may be uniform throughout the second region. In other embodiments, a material property of one or more regions may be tailored to have a gradient in one direction and be substantially uniform in a transverse direction. For example, the density of a region may decrease along an axial direction, for example from an internal surface towards an outer surface, where the density is substantially uniform along the radial direction.

Additive manufacturing methods disclosed herein may be used to form other components of a high pressure press to provide the components with tailored material properties. Components of high pressure presses may include, for example, sample holders such as bushings or other types of pressure containers, end buttons or other components used to cap off or enclose a sample within the sample holders, and a belt or other sealing or gasket components and may include components of various types of high pressure presses, including but not limited to belt type presses and cubic type presses. According to some embodiments of the present disclosure, a container for use in a high pressure press may include a body having a height measured along a central axis and a receiving cavity opening to at least one outer surface of the body, where the body has a density that is uniform along the entire height of the body and varies along a direction transverse to the central axis. In some embodiments, a component for use in a high pressure press may include a body having at least two discrete regions, and at least one current path extending in a complex or multi-directional path through the discrete regions.

Components of the present disclosure may be used to press a sample under high pressure (and optionally high temperature) conditions. For example, a container made according to embodiments disclosed herein may receive a sample within a receiving cavity, and at least one end button made according to embodiments disclosed herein may be inserted into the receiving cavity to seal the sample within the receiving cavity. Force may then be exerted on the container and the at least one end button in order to subject the sample to high pressures. In some embodiments, a sample may include a mixture of diamond particles, where upon subjecting to the sample to high pressure and high temperature, the diamond particles are sintered together to form polycrystalline diamond. However, other materials, such as transition metal carbide or boron nitride, may be sintered or pressed using components made with additive manufacturing according to embodiments of the present disclosure. Force may be exerted on components of the present disclosure in a high pressure press, for example, using anvils in a cubic high pressure press or a belt-type high pressure press, which may compress the outer surfaces of one or more components, thereby resulting in pressure transfer to the enclosed receiving cavity and sample sealed therein.

In addition to being useful for prototype development and single piece manufacturing, methods of the present disclosure may also allow the creation of component geometries and material compositions that otherwise may not be made using conventional techniques. For example, as described above, components that include multiple types of materials with interlocking geometries may be formed with a single additive manufacturing process such that the multiple materials are formed integrally together as a single piece component. Additionally, methods of the present disclosure may allow tailoring of material properties throughout a component, e.g., a designed density or compressibility of material throughout the component. In some embodiments, a density gradient may be created through a component, where the density is greater along an internal wall or core of the component than the density along an outer wall of the component in order to provide improved pressing efficiency. For example, in some embodiments of a container formed using methods of the present disclosure where the density is designed to be greater along the core or receiving cavity wall than along the outer walls of the container, the density increase at the core may allow more material to be retained with the receiving cavity and thereby lead to higher core pressures without compromising on flowability and conformability on the regions of the component that act as a gasket.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of manufacturing a component for use in a high pressure press, the method comprising:
    successively depositing a volume of a thermally insulating material using a deposition device to build a first region of a three dimensional body of the component extending from a bottom surface of the component to a non-planar interface;
    successively depositing a volume of a gasketing material using the deposition device to build a second region of the three dimensional body extending from the non-planar interface to a top surface of the component, the top surface being at an opposite axial end from the bottom surface of the component,
        wherein the gasketing material is selected from clay minerals and phyllosilicates; and
        wherein the first region and the second region are two discrete regions having the non-planar interface therebetween; and
    successively depositing a volume of a conductive material using the deposition device to build at least one current path extending through the first region and the second region, from the top surface of the component to the bottom surface of the component, that transverses the non-planar interface.

2. The method of claim 1, wherein the at least one current path extends through the first region and the second region in multiple directions between the top surface of the component and the bottom surface of the component.

3. A method of manufacturing a component for use in a high pressure press, the method comprising:
    successively depositing multiple sequential layers of a gasketing material using a deposition device to build a first region of a three dimensional body of the component;
        wherein the first region forms at least one outer surface of the component and a portion of an inner wall defining a receiving cavity extending through the component; and
        wherein the gasketing material is selected from clay minerals and phyllosilicates; and
    using the deposition device to deposit the gasketing material and a second material in distinct portions of multiple sequential compound layers to build a second region of the three dimensional body surrounded by the first region, such that the second region at least partially mates with and fits within a corresponding recessed geometry of the first region;
        wherein the second material is different from the gasketing material;
        wherein the second region forms a remaining portion of the inner wall of the receiving cavity; and
        wherein the second region has a gradually decreasing thickness along the inner wall from an axially central region of the receiving cavity towards axial ends of the receiving cavity.

4. The method of claim 3, wherein the second material is a thermally insulating material.

5. The method of claim 3, wherein the second material is graphite.

6. A method of manufacturing a component of a high pressure press, comprising:
    depositing a first layer on a substrate, the first layer having a first material composition comprising a gasketing material selected from clay minerals and phyllosilicates;
    depositing multiple sequential layers comprising at least one of the first material composition and a second material composition at least partially adjacent the first layer to build a three dimensional body of the component, comprising:
        a first region formed of the first material composition;
        a second region formed of the second material composition; and
        a receiving cavity formed through the first region and the second region, such that the first region and the second region form portions of an inner wall defining the receiving cavity,
        wherein the receiving cavity has a uniform diameter along an entire height of the receiving cavity; and
    providing at least one binder to bind the first layer and multiple sequential layers.

7. The method of claim 6, further comprising heating the component to remove one or more of the at least one binder.

8. The method of claim 6, further comprising removing one or more of the at least one binder by chemical decomposition.

9. The method of claim 6, wherein the second region is inlaid within the first region.

10. The method of claim 3, wherein the receiving cavity has a geometry comprising a spherical shaped portion.

* * * * *